(12) United States Patent
Kardatzke (10) Patent No.: US 8,943,529 B2
(45) Date of Patent: Jan. 27, 2015

(54) SYSTEMS, METHODS, AND MEDIA FOR INHIBITING THE PRESENTATION OF SPOILER CONTENT BASED ON REQUESTED CONTENT

(71) Applicant: Jeffrey Arthur Kardatzke, Redondo Beach, CA (US)

(72) Inventor: Jeffrey Arthur Kardatzke, Redondo Beach, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/648,208

(22) Filed: Oct. 9, 2012

(65) Prior Publication Data

US 2014/0101706 A1      Apr. 10, 2014

(51) Int. Cl.
*H04H 60/32*      (2008.01)

(52) U.S. Cl.
USPC ................... 725/21; 725/14; 725/25; 725/86; 725/116

(58) Field of Classification Search
USPC ............... 725/9, 14, 21, 25, 58, 86, 102, 110, 725/116, 120
See application file for complete search history.

(56) References Cited

U.S. PATENT DOCUMENTS

| | | | | |
|---|---|---|---|---|
| 2007/0143493 | A1* | 6/2007 | Mullig et al. | 709/232 |
| 2007/0157237 | A1 | 7/2007 | Cordray et al. | |
| 2007/0157249 | A1* | 7/2007 | Cordray et al. | 725/58 |
| 2009/0208180 | A1 | 8/2009 | Ashby et al. | |
| 2011/0283309 | A1 | 11/2011 | Bliss et al. | |
| 2012/0072941 | A1* | 3/2012 | Thornberry et al. | 725/14 |

* cited by examiner

*Primary Examiner* — Nnenna Ekpo
(74) *Attorney, Agent, or Firm* — Byrne Poh LLP (57) ABSTRACT

Systems, methods, and media for inhibiting the presentation of spoiler content based on requested content are provided. In some embodiments, a method or content management is provided, the method comprising: determining a channel that has been selected for presenting content to a user; identifying the content presented on the channel as requested content based on a comparison of first metadata associated with the content and second metadata associated with recorded content on a storage device; determining that the requested content contains spoiler content based on one or more criterion, wherein the one or more criterion include (i) determining that the first metadata associated with the content includes episode data or airing data; (ii) determining that the first metadata associated with the content indicates that the content belongs to a non-excluded content category; or (iii) determining, for the recorded content not viewed to completion, that the second metadata associated with the recorded content indicates an earlier occurrence than the first metadata associated with the requested program; and, in response to determining that a plurality of the one or more criterion have been met, selecting an alternate channel for presentation.

30 Claims, 6 Drawing Sheets

SYSTEMS, METHODS, AND MEDIA FOR INHIBITING THE PRESENTATION OF SPOILER CONTENT BASED ON REQUESTED CONTENT

TECHNICAL FIELD

The disclosed subject matter relates to systems, methods, and media for inhibiting the presentation of spoiler content based on requested content. More particularly, the disclosed subject matter relates to inhibiting the presentation of spoiler content when selecting a channel based on the contents of a storage device.

BACKGROUND

When a user turns on a television and/or a set-top box connected to that television, television programming on a default television channel is often displayed. If the user has recorded one or more programs on a storage device, such as a digital video recorder (DVR), the content being displayed on the default television channel can include content that the user has recorded but has not yet watched. Such a display of recorded and unwatched content to the user can spoil the recorded content for the user by, for example, giving away a plot point of a show or an ending to a movie or sporting event.

Accordingly, it is desirable to provide systems, methods, and media that overcome these and other deficiencies of the prior art.

SUMMARY

In accordance with various embodiments of the disclosed subject matter, systems, methods, and media for inhibiting the presentation of spoiler content based on requested content are provided.

In accordance with some embodiments of the disclosed subject matter, a method for content management is provided, the method comprising: determining, using a hardware processor, a channel that has been selected for presenting content to a user; identifying, using the hardware processor, the content presented on the channel as requested content based on a comparison of first metadata associated with the content and second metadata associated with recorded content on a storage device; determining, using the hardware processor, that the requested content contains spoiler content based on one or more criterion, wherein the one or more criterion include (i) determining that the first metadata associated with the content includes episode data or airing data; (ii) determining that the first metadata associated with the content indicates that the content belongs to a non-excluded content category; or (iii) determining, for the recorded content not viewed to completion, that the second metadata associated with the recorded content indicates an earlier occurrence than the first metadata associated with the requested program; and, in response to determining that a plurality of the one or more criterion have been met, selecting, using the hardware processor, an alternate channel for presentation.

In some embodiments, the first metadata is a first subset of program data associated with a television program being presented on the channel and the second metadata is a second subset of program data associated with a recorded program stored on the storage device.

In some embodiments, the first metadata and the second metadata include at least one of: a program title, a program identifier, an episode number, an episode title, a season number, a season title, a series number, a series identifier, an original airing date, an original airing channel, and a category.

In some embodiments, identifying the content presented on the channel as requested content further comprises determining one or more record requests stored on the storage device. In some embodiments, identifying the content presented on the channel as requested content further comprises determining that the content scheduled for presentation on the channel is currently being recorded on the storage device.

In some embodiments, the method further comprises: determining whether the content category associated with the requested content belongs to an excluded content category; and inhibiting the requested content from being designated as containing spoiler content in response to determining that the requested content belongs to the excluded content category.

In some embodiments, the method further comprises determining whether the recorded content has not been viewed to completion by extracting viewing data from the second metadata associated with the recorded content stored on the storage device.

In some embodiments, selecting the alternate channel for presentation further comprises: detecting that a first tuner has tuned to the channel; and controlling a second tuner to tune to the alternate channel in response to the determination that the requested content contains spoiler content.

In some embodiments, the earlier occurrence is determined by comparing the episode data or the airing data associated with the recorded content to the episode data or the airing data associated with the requested program.

In some embodiments, the method further comprises: identifying preceding content provided on the channel as requested content; determining a content category associated with the preceding content; assigning a time window based on the content category associated with the preceding content; determining a current time that the channel has been selected for presenting the content to the user; and determining whether preceding content scheduled to be presented on the channel within the time window contain spoiler content.

In accordance with some embodiments of the disclosed subject matter, a system for content management is provided, the system comprising a media storage device that stores a plurality of recorded content upon request by a user; and a processor that is configured to: determine a channel that has been selected for presenting content to a user; identify the content presented on the channel as requested content based on a comparison of first metadata associated with the content and second metadata associated with recorded content stored in the media storage device; determine that the requested content contains spoiler content based on one or more criterion, wherein the one or more criterion include (i) determining that the first metadata associated with the content includes episode data or airing data; (ii) determining that the first metadata associated with the content indicates that the content belongs to a non-excluded content category; or (iii) determining, for the recorded content not viewed to completion, that the second metadata associated with the recorded content indicates an earlier occurrence than the first metadata associated with the requested program; and, in response to determining that a plurality of the one or more criterion have been met, select an alternate channel for presentation.

In accordance with some embodiments of the disclosed subject matter, a computer-readable medium containing computer-executable instructions that, when executed by a processor, cause the processor to perform a method for content management, is provided. The method comprising: determining a channel that has been selected for presenting content to a user; identifying the content presented on the channel as requested content based on a comparison of first metadata associated with the content and second metadata associated with recorded content on a storage device; determining that the requested content contains spoiler content based on one or more criterion, wherein the one or more criterion include (i) determining that the first metadata associated with the content includes episode data or airing data; (ii) determining that the first metadata associated with the content indicates that the content belongs to a non-excluded content category; or (iii) determining, for the recorded content not viewed to completion, that the second metadata associated with the recorded content indicates an earlier occurrence than the first metadata associated with the requested program; and, in response to determining that a plurality of the one or more criterion have been met, selecting an alternate channel for presentation.

BRIEF DESCRIPTION OF THE DRAWINGS

Various objects, features, and advantages of the disclosed subject matter can be more fully appreciated with reference to the following detailed description of the disclosed subject matter when considered in connection with the following drawing in which like reference numerals identify like elements.

DETAILED DESCRIPTION

In accordance with some embodiments of the disclosed subject matter mechanisms for inhibiting the presentation of spoiler content based on requested content are provided. Generally speaking, spoiler content can include content that is presented to a user on a television display device, where that content or similar content is currently requested for recordation, is currently being recorded, or has been recorded, on a storage device, such as a digital video recorder (DVR) or any other suitable storage device, and has not yet been viewed by the user. For example, when a user records a particular episode of the program "Top Chef" on a storage device connected to the television display device, the presentation of "Top Chef" content relating to that episode or subsequent episodes with a later original airing date can be considered spoiler content for that user. In another example, when a user records media content (e.g., a particular sporting event) on a storage device connected to the television display device, the presentation of an ending portion of that media content during the beginning portion of subsequently displayed media content can be considered spoiler content for that user.

When the user turns on a television display device, a tuner or any other suitable circuitry can tune to a selected channel and content from the selected channel can be presented to the user on the television display device. The channel can be selected based on, for example, a default channel, the last known channel that the user has selected, the channel that most recently recorded a piece of content into a storage device, the channel associated with a program reminder, etc. In another example, the channel can be a channel that is randomly selected by the television display device. To inhibit the presentation of spoiler content to a user, a content management application is provided that can determine whether the selected channel may present the user with spoiler content. Upon determining that such spoiler content may be presented, the content management application can direct the user to other media content. For example, the content management application can instruct a tuner or any other suitable control circuitry associated with the television display device to tune to an alternate channel that does not present the user with spoiler content.

In some embodiments, the content management application can determine whether spoiler content may be provided for a selected channel by determining whether the content being displayed on the selected channel is requested content. More particularly, the content management application can determine whether the content being displayed on the selected channel has also been selected for recording on a storage device (e.g., an individual program that has been selected for recording in response to a user selecting a record option on a remote control, a program has been selected for recording in response to a user configuring a series recording for an episodic program a program that has been automatically selected for recording based on the user's preferences, etc.). In some embodiments, in addition to content that has been selected for recording, requested content can also include recorded content that is stored on the storage device, but has not been viewed to completion by the user.

In some embodiments, the content management application can access the storage device and analyze its content. For example, the content management application can access a database of recording requests, recorded content, and metadata relating to the content stored on the storage device. The content management application can determine, from the retrieved metadata, which content has been selected for recording and associated content information (e.g., program title, episode number, season number, original airing date, etc.), which content has been stored on the storage device and associated content information, and/or which pieces of recorded content have been viewed by the user to completion (e.g., playback information that indicates whether the recorded content has been completely viewed by the user, playback information that indicates that the recorded content has not been viewed by the user, an end time that the user stopped playing back the recorded content, a flag indicating whether the user has played any portion of the recorded content, an indication of a percent of the recorded program viewed, any other suitable indication, or any suitable combination thereof).

Additionally, the content management application can extract particular metadata, such as a program title, a season number, an episode number, an original airing date, and/or a program category. In the example above, the content management application can determine that episode 14 entitled "The Finale" of season 6 of the television program "Top Chef" was selected for recording on the storage device connected to the television display device. Additionally or alternatively, the content management application can transmit a query to the storage device to retrieve the relevant metadata. For example, the content management application can transmit a query to an alternate source, such as a media guidance data source or metadata source, to retrieve the relevant metadata. In another example, the content management application can transmit metadata extracted from recorded content as part of a search query to obtain additional metadata from the alternate source. In yet another example, to determine whether content provided on the selected channel is requested content, the content management application can transmit a search query that includes particular metadata associated with the content provided on the selected channel to the storage device, where the search query requests the identification of the same or similar metadata associated with recorded content on the storage device.

In response to determining that the content being displayed on the selected channel is the same or similar to the content selected for recording on the storage device, the content management application can designate such content being displayed on the selected channel as requested content.

It should be noted that any suitable approach for designating requested content can be used. For example, in some embodiments, the content management application can use the extracted metadata to determine recorded content that has not been viewed to completion by the user. In response to determining that the content being displayed on the selected channel is the same or similar to the unviewed recorded content on the storage device, the content management application can designate such content being displayed on the selected channel as requested content.

In some embodiments, the content management application can determine whether the requested content can be considered spoiler content for that user of the television display device. For example, the content management application can perform one or more verifications to determine whether the requested content contains spoiler content.

In some embodiments, one suitable verification performed by the content management application can include determining whether the requested program is episodic. For example, the content management application can obtain metadata associated with the requested program and determine whether episode data (e.g., an episode number, a season number, etc.) or a type of episode data is associated with the requested program. Additionally or alternatively, the content management application can obtain other suitable metadata associated with the requested program, such as an original airing date associated with the requested program.

In some embodiments, another suitable verification performed by the content management application can include determining a category associated with the requested program. For example, in response to determining that the requested program has been placed in a particular category (e.g., an excluded category, such as news-related content), the content management application can designate the requested content as content not likely to contain spoiler content. In a more particular example, the content management application can include a rule that excludes news-related content from being designated as spoiler content. In another more particular example, the content management application can maintain a list of excluded categories and/or non-excluded categories for designating spoiler content.

In some embodiments, yet another particular verification performed by the content management application can include determining which recorded content on the storage device has not been viewed by the user to completion and comparing the extracted metadata associated with the requested content being provided by the selected channel with the extracted metadata associated with the unviewed recorded content stored on the storage device. This can include, for example, determining whether an episode number and/or season number associated with the unviewed recorded content is earlier than the episode number and/or season number associated with the requested content. For example, the content management application can inhibit the presentation of the same program that is stored and unviewed on the storage device and can inhibit the presentation of future episodes to the user (e.g., episode 15 entitled "The Finale—Part 2" of the program "Top Chef").

In some embodiments, the content management application can, for a given window time, determine whether content that preceded the content currently being presented on the selected channel is also requested content. In response to determining that preceding content is requested content, the content management application can perform one or more of the above-mentioned verifications to determine whether the preceding content provided by the channel contains spoiler content. The content management application can determine a time window that starts from the scheduled end time of the preceding content. Upon determining that the current time that the tuner or other circuitry associated with the television display device has tuned to the selected channel in within that time window, the content management application can designate the selected channel as containing spoiler content. This can inhibit the portion of unviewed recorded content that runs over into the beginning of the subsequent content from being presented to the user. It should also be noted that the window of time can be modified based on, for example, program category (e.g., news, sporting event, etc.), user selection, etc.

In response to determining that the requested content on the selected channel may provide spoiler content, the content management application can select an alternate channel and determine whether the alternate channel may provide spoiler content. Upon determining that the alternate channel does not present a requested program that contains spoiler content, the content management application can instruct the tuner or any other suitable circuitry associated with the television display device to tune to the alternate channel. Otherwise, the content management application can continue to select alternate channels until, for example, an alternate channel is found that does not present a requested program that contains or has a likelihood of containing spoiler content.

Additionally or alternatively, in some embodiments, if all of the available channels present a requested program that contains or has a likelihood of containing spoiler content, the content management application can select an arbitrary channel. In some embodiments, the content management application can arbitrarily select a channel having content of a particular category (e.g., a channel that generally presents news-related content).

Although the embodiments described herein generally relate to inhibiting the presentation of spoiler content with respect to broadcast television programs, this is merely illustrative. For example, with respect to social media sources, the content management application can access a social media source and social media information associated with the user and, upon analyzing the recording requests, recorded content, and/or viewing status of recorded content on a digital video recorder or any other suitable storage device, can inhibit the presentation of spoiler content in the form of social messaging to the user on the television display device or any other suitable device (e.g., a mobile device, a tablet computing device, or a second screen device connected to the television device).

Figure 1:
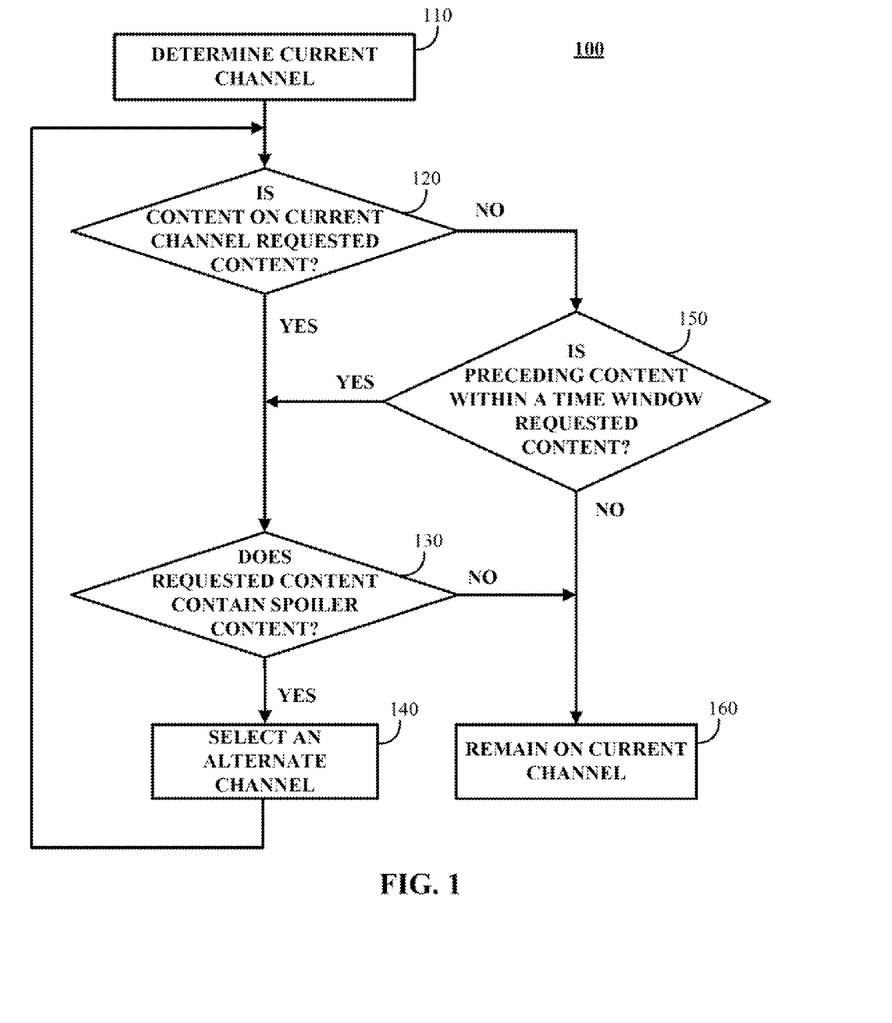
FIG. 1 is a flowchart of an illustrative process for inhibiting the presentation of spoiler content when selecting a channel based on the requested content in accordance with some embodiments of the disclosed subject matter.

Turning to FIG. 1, FIG. 1 is a flow chart of an illustrative process 100 for inhibiting the presentation of spoiler content when selecting a channel based on requested content in accordance with some embodiments.

As shown, process 100 can begin by determining a current channel that has been selected for presenting content to the user at 110. For example, if the content management application determines that the television display device has multiple tuners, the content management application can determine which tuner has selected a current channel for presenting content to the user. In another suitable example, the content management application can determine that the television display device automatically tunes to a default channel in response to turning on the television display device and/or set-top box. As described above, the default channel can be selected using any suitable approach—e.g. the default channel can be the last channel selected by a user, the default channel can be the channel used to recently record or currently record content, etc.

In response to determining the channel, the content management application can determine whether the content provided by the channel is requested content at 120. For example, this determination can include analyzing metadata associated with a storage device (e.g., a digital video recorder connected to the television display device) and determining whether the content being provided on the channel has also been selected for recording on the storage device. The content management application can use the metadata associated with the storage device to determine whether one or more record requests for particular content have been made (e.g., a record request for an episode of a program in response to the user selecting a record option on a remote control or other suitable user input device, a series record request for multiple episodes of a program, an automatically generated record request based on user preferences, etc.). Additional metadata associated with the record requests, such as program title, a program identifier, an episode number, a season number, a series number, a series identifier, an original airing date, an original airing channel, and/or a content category, can also be extracted by the content management application. Additionally or alternatively, the content management application can analyze the metadata associated with the storage device to determine both record requests and unviewed recorded content stored on the storage device.

Upon comparing the metadata associated with the content provided by the channel and the metadata associated with the storage device (e.g., metadata associated with record requests, metadata associated with recorded content, etc.), the content management application can determine whether the content provided by the channel is requested content. For example, the content management application can determine whether a program title associated with the content provided by the channel matches a program title associated with a record request or recorded content. In another example, the content management application can determine whether at least one keyword in a program title matches a portion of the program title in a record request or recorded content. In response to determining that the metadata associated with the content provided by the channel is the same or similar to the metadata associated with the storage device, the content management application can designate the content provided by the channel as requested content.

It should be noted that any other suitable metadata can be used to determine whether the content provided by the channel is requested content. For example, the content management application can analyze a description of the program, the cast of the program, the running time of the program, a season of the program, an original air date of the program, a channel of the program, etc., to determine whether the current program matches a record request or recorded content. In another suitable example, if two programs have the same title, but have original airing dates that indicate that the two programs are not related, the content management application can determine that the two programs do not match despite having the same title. In a more particular example, if the content provided by a channel is an episode of "The Twilight Zone" that originally aired in 1985 and the unviewed recorded content stored on the storage device is an episode of "The Twilight Zone" that originally aired in 1959, the content management application can use this information to determine that the two programs are not part of the same series.

Alternatively, it should be noted that, instead of retrieving and/or analyzing metadata associated with the content being displayed by the channel, metadata associated with the record requests, and/or metadata associated with the recorded content, the content management application can transmit a query for particular metadata to an appropriate source. For example, the content management application can transmit a query, to the storage device for a program identifier and an episode number. In another example, the content management application can transmit a query to a program guide data source for a program identifier and an episode number associated with the content provided on the channel. In yet another example, the content management application can receive metadata relating to a program from a first source, such as a digital video recorder, and transmit the received metadata to a second source, such as a program guide data source, for obtaining additional metadata corresponding to the program.

In some embodiments, the content management application can transmit a search query to a storage device to search for a particular keyword (e.g., a program title) within the metadata associated with the storage device. In response to receiving an indication that the keyword has matched at least one piece of metadata associated with a record request or recorded content in the storage device, the content management application can designate the content provided by the channel as requested content.

In some embodiments, with regard to recorded content, the content management application can also determine whether the recorded content has been viewed by the user. For example, the content management application can extract viewing data or other suitable metadata from the storage device that indicates whether recorded content has been viewed to completion by the user. Such extracted viewing data can include, for example, a completion indicator indicating that the user has viewed the recorded content to completion, an indicator indicating that the user has not been viewed by the user, an end time that the user stopped playing back the recorded content, a playback percentage, etc. In this embodiment, the content management application can designate requested content based on record requests and recorded content that has not been viewed to completion by the user.

It should be noted that the content management application can use any suitable approach for determining whether a user has viewed recorded content to completion. For example, if a threshold percentage (e.g., 100%, 95%, 80%, etc.) of a recorded television program is indicated as having been viewed, the content management application can consider the recorded television program on the storage device to be viewed to completion. In another example, the content management application can provide the user with an opportunity to set the threshold percentage. In yet another example, the content management application can set a threshold percentage based on a content category associated with the recorded content (e.g., recorded content in a talk show category receives a threshold percentage of 80%, while recorded content in a sports category receives a threshold percentage of 100%). In a further example, the content management application can prompt the user to indicate whether the user considers the playback of a recorded television program to be completed in response to detecting that the user has stopped playing back the recorded television program.

Referring back to FIG. 1, in response to determining that the content provided by the current channel is requested content, the content management application can determine whether the requested content is likely to contain spoiler content at 130. As described above, spoiler content can include content that is presented to a user on a television display device, where that content or similar content is currently requested for recordation (e.g., by a record request), is currently being recorded on the storage device, or has been recorded on the storage device and has not yet been viewed by the user.

In some embodiments, the content management application can perform one or more verifications to determine whether the requested content is likely to contain or does contain spoiler content (which is described in more detail in connection with FIGS. 2 and 3). For example, the content management application can determine whether content (e.g., a television program) provided on the current channel meets particular criteria—the content is episodic (e.g., an episode number or a season number is associated with the content), has airing data (e.g., an original airing date), falls within a particular content category (e.g., a movie category, a sports category, a drama category, but not a news category). In response to determining that the content has episode data or airing data and is categorized within a non-excluded category, the content management application can determine whether the content provided on the current channel has episode data or airing data that occurring on or after the episode data or airing data of the related recorded content in the storage device.

In a more particular example, the content management application can determine that the requested content "Lost" provided on the channel has episode data (e.g., season 3, episode 6) and has not been placed into a news-related content category or any other suitable excluded content category. In response, the content management application can determine the episode data, airing data, viewing data, and other metadata associated with the program "Lost" that has been recorded or selected for recordation on a digital video recorder. In such an example, in response to determining that the user has recorded but not viewed to completion the first five episodes of the program "Lost" in season 6, the content management application can determine that providing that particular episode of the program "Lost" on the current channel is spoiler content to the user.

In another more particular example, the content management application can determine that the requested program "Lost" provided on the channel has an original airing date and is currently being recorded on the storage device. In response to determining that the requested content has an original airing date of the current date, has not been placed into a news-related content category, and is currently being recorded on the storage device, the content management application can determine that providing that particular episode of the program "Lost" on the current channel is spoiler content to the user.

In response to determining that the requested content provided on the current channel is likely to contain or does contain spoiler content the content management application can select an alternate channel at 140. As shown in FIG. 1, the content management application can select an alternate channel and return to 120, where it is determined whether the alternate channel provides requested content that contains spoiler content. Upon determining that the alternate channel does not contain requested content or spoiler content, the content management application can instruct a tuner or any other suitable circuitry associated with the television display device to tune to the alternate channel. For example, for a television display device having multiple tuners, the content management application can instruct an available tuner to tune to the alternate channel and switch from the current tuner tuned to the current channel to the available tuner tuned to the alternate channel. In another example, the content management application can prompt the user to accept the recommendation to tune to an alternate channel based on the determination that the current channel is providing spoiler content to the user.

It should be noted that the alternate channel can be selected from a list of alternate channels, from a list of alternate channels in a different content category, randomly from multiple channels, etc. Alternatively, the alternate channel can be a channel adjacent to the current channel.

In some embodiments, the content management application can continue to select alternate channels until an alternate channel is found that does not provide requested content that has the likelihood of containing or does contain spoiler content. For example, if the content management application determines that content provided on the alternate channel is a requested program (e.g., because the program matches other recorded content or other record requests associated with the storage device) and determines that the content includes spoiler content, the content management application can select another alternate channel.

Alternatively, in some embodiments, if all of the available channels provide spoiler content, the content management application can randomly select a channel. For example, the content management application can arbitrarily select a channel having content belonging to an excluded content category (e.g., a channel that generally provides news-related content).

Referring back to the determination of requested content at 120 and the determination of spoiler content at 130 in FIG. 1, the content management application can, in some embodiments, review preceding content within a predetermined amount of time or within a particular time window at 150 (which is described in more detail in connection with FIG. 3). For example, although the content scheduled to be provided by the current channel is not requested content or does not contain spoiler content, the content management application can determine whether past or preceding content provided on the channel contains spoiler content and provide a particular time window (e.g., fifteen minutes, one hours, etc.) for not tuning to the channel. This can be used, for example, to determine whether preceding content containing spoiler content was scheduled to be provided on the channel and can inhibit the presentation of such spoiler content when the preceding content runs over into the beginning on subsequent programming (e.g., the end of a recorded television program that the user has not yet viewed).

In response to determining that the preceding content is requested content and that the current time is within the time window at 150, the content management application can determine whether the preceding content is likely to contain or does contain spoiler content at 130 and, based on that determination, select an alternate channel at 140. Alternatively, the content management application can determine whether the preceding content contains spoiler content and, in response to determining that the current time is within the time window, can select an alternate channel.

Otherwise, the content management application can remain on the current channel at 160. For example, the content management application can transmit an indication to the television display device to allow a tuner to tune to the current channel and provide the corresponding content to the user.

It should be understood that the above described steps of the flow diagram of FIG. 1 can be executed or performed in any order or sequence not limited to the order and sequence shown and described in the figure. Also, some of the above steps of the flow diagram of FIG. 1 can be executed or performed substantially simultaneously where appropriate or in parallel to reduce latency and processing times.

For example, in some embodiments, the content management application can maintain a list of record requests, recorded content, and particular metadata associated with the record requests and recorded content from the storage device. In such a list, the content management application can determine record requests and, based on viewing data (e.g., an indication of whether the program has been viewed, by the user, an indication of whether the program has been viewed to completion by the user, etc.), recorded content that has not been viewed by the user on the storage device. In a more particular example, the content management application can designate recorded content that has not been viewed to completion as unviewed recorded content. This can be done prior to determining the current channel at 110 and/or detecting that the television display device has been turned on. In response to detecting that the television display device has been turned on and/or receiving a request from the television display device to tune to a default channel, the content management application can analyze the content for display on the default channel and can compare the content on the default channel to the list of record requests, recorded content, and particular metadata associated with the record requests and recorded content from the storage device.

In some embodiments, the content management application can update the list of record requests, recorded content, and associated metadata. For example, the content management application can update the list in response to receiving a record request from the user (e.g., pressing a record button on a remote control for a program listing within a program guide grid, setting up a series recording, etc.). In another example, the content management application can poll the storage device at particular times.

As described above, the content management application can perform one or more verifications to determine whether the requested content contains or is likely to contain spoiler content.

Figure 2:
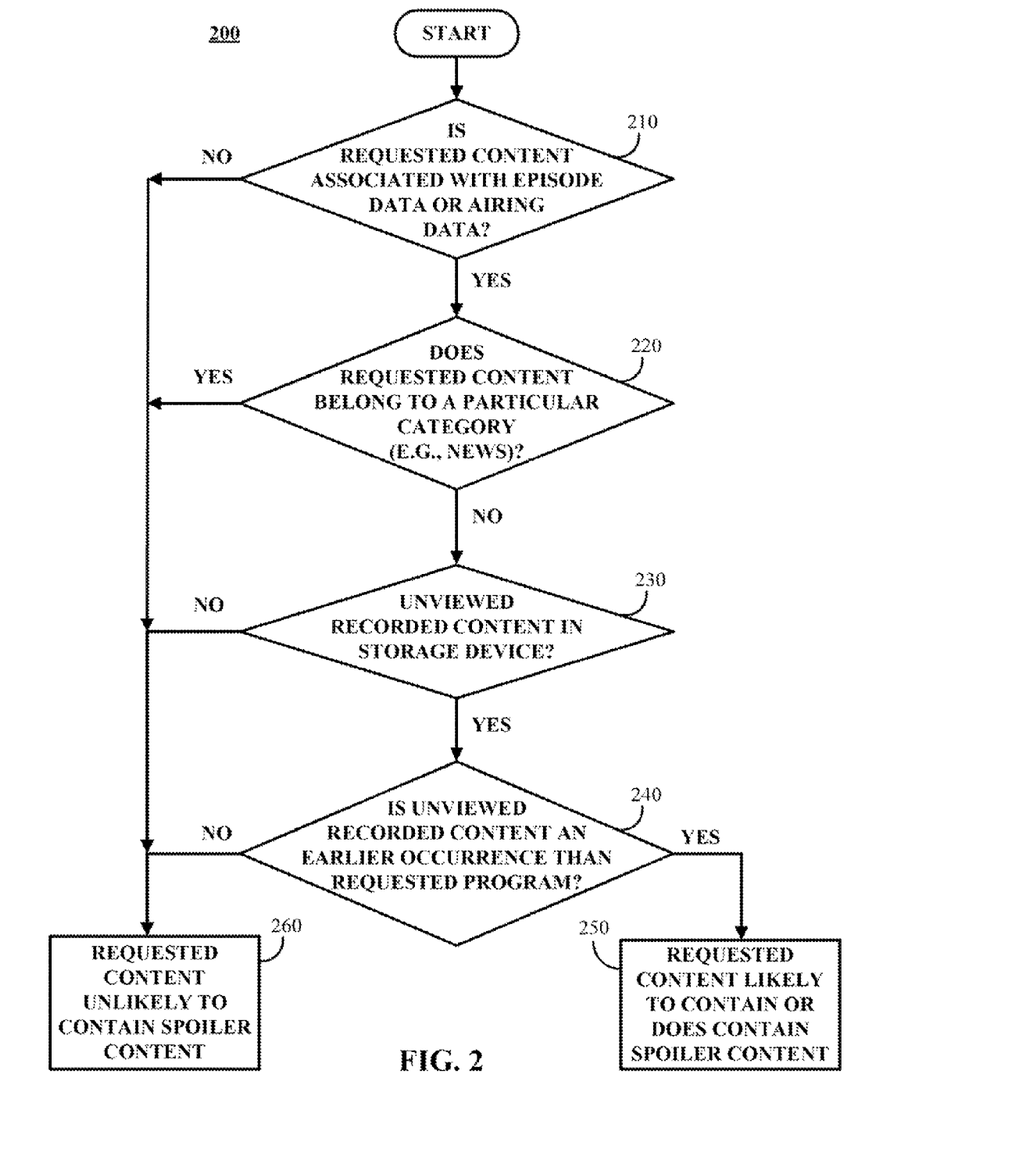
FIG. 2 is a flowchart of an illustrative process for determining whether requested content contains spoiler content in accordance with some embodiments of the disclosed subject matter.

Turning to FIG. 2, FIG. 2 is a flow chart of an illustrative process 200 for determining whether requested content contains spoiler content in accordance with some embodiments. As described above, this determination can include the use of metadata associated with the requested content and metadata associated with the storage device (e.g., metadata associated with media content in record requests, metadata associated with recorded content stored in the storage device, etc.). For example, the content management application can compare a program title, a series title, an episode title, a season number, an episode number, a unique reference number, an original airing date, or any other suitable metadata associated with the requested content with similar types of metadata associated with the storage device.

In some embodiments, the content management application can determine whether the requested content is associated with episode data or airing data at 210. For example, the content management application can transmit a query to the set-top box or any other suitable media guidance data source to determine whether episode data (e.g., an episode number, an episode title, a season number, a season title, etc.) or airing data (e.g., an original airing date, an original airing source, etc.) are associated with the requested content. For example, the content management application can determine if the requested content is one episode in a series having multiple episodes. As another example, the content management application can determine if there is an original airing date associated with the requested content. In such an example, an original airing date can indicate a date when the requested content was originally broadcasted. The original airing date can be an actual airing date (e.g., Aug. 1, 2012) or any other suitable information that can be used to identify the original airing date of the requested program (e.g., a program identifier, an episode number, etc.).

In response to receiving any such episode data, the content management application can determine that the requested content meets this criterion and proceeds to 220. Alternatively, if the content management application determines that the requested content is not associated with episode data and/or airing data, the content management application can indicate that the requested content is unlikely to contain spoiler content at 260. For example, this indication can be provided as a response to the determination of spoiler content at 130 of FIG. 1.

In some embodiments, the content management application can determine whether the requested content belongs to a particular category such as an excluded category, at 220. For example, the content management application can transmit a query (e.g., part of the query in 210) to the set-top box or any other suitable media guidance data source to determine a category associated with the requested content. In a more particular example, using extracted or retrieved metadata associated with the requested content, the content management application can determine whether the requested content belongs to an excluded category, such as a news-related category. In response to determining that the requested program does not belong to an excluded category (e.g., news-related content), the content management application can determine that the requested content meets this criterion and proceeds to 240.

Alternatively, if the content management application determines that the requested content does belong to an excluded category, the content management application can indicate that the requested content is unlikely to contain spoiler content at 260. For example, this indication can be provided as a response to the determination of spoiler content at 130 of FIG. 1.

It should be noted that, in some embodiments, the content management application can access a list of excluded categories of content. For example, one or more categories can be designed as excluded category by default in the content management application. In such an example, news-related content (e.g., a local news program, a national news program, a sports news program, etc.) can be set by the content management application as an excluded category. Additionally or alternatively, the content management application can provide the user with an opportunity to designate which categories of content are excluded categories. For example, the content management application can allow the user to add or remove particular categories of content from a list of excluded categories. In another example, the content management application can allow the user to include particular content (e.g., a recorded television, program, a record request, etc.) on a list of excluded content from the spoiler content determination. The content management application can allow the user to include a particular cooking program on the list of excluded content because, although the user records the program, the user does not consider the cooking program to contain spoiler content.

Referring back to FIG. 2, in some embodiments, the content management application can determine whether recorded content in the storage device that is related to the requested content (e.g., by program title, by keyword, by program identifier, by other metadata, etc.) has been viewed to completion by the user at 230. As described above, the content management application can extract viewing data or other suitable metadata from the storage device that indicates whether recorded content has been viewed to completion by the user. Again, it should be noted that the content management application can use any suitable approach for determining whether a user has viewed recorded content to completion can be based on various factors (e.g., content category, threshold viewing percentage, user indication, etc.).

In response to determining that the recorded content on the storage device has not been viewed to completion, the content management application can determine whether the unviewed recorded content occurs earlier in time than the requested program. For example, the content management application can compare episode data, such as episode number and season number, associated with the requested program and episode data associated with the recorded program. In another example, the content management application can compare airing data, such as an original airing date, associated with the requested program and airing data associated with the recorded program. Upon determining that the recorded program on the storage device has an earlier season number, episode number, and/or original airing date than the requested program, the content management application can indicate that the requested content is likely to contain or does contain spoiler content for the user at 250. This indication can be provided as a response to the determination of spoiler content at 130 of FIG. 1.

In a more particular example, the content management application can determine that the unviewed recorded program is episode 10 of season 1 of the program "Lost" and the requested program is episode 12 of season 1 of the program "Lost." A newer episode in a television series, where the user has not completely viewed prior episodes of the television series that are recorded on a storage device, is likely to contain spoiler content for that user. Accordingly, in this example, the content management application determines that the requested program contains spoiler content for the user.

Alternatively, if the content management application determines that the recorded content is not an earlier occurrence than the requested content based on episode data or airing data, the content management application can indicate that the requested content is unlikely to contain spoiler content at 260. For example, this indication can be provided as a response to the determination of spoiler content at 130 of FIG. 1.

Figure 3:
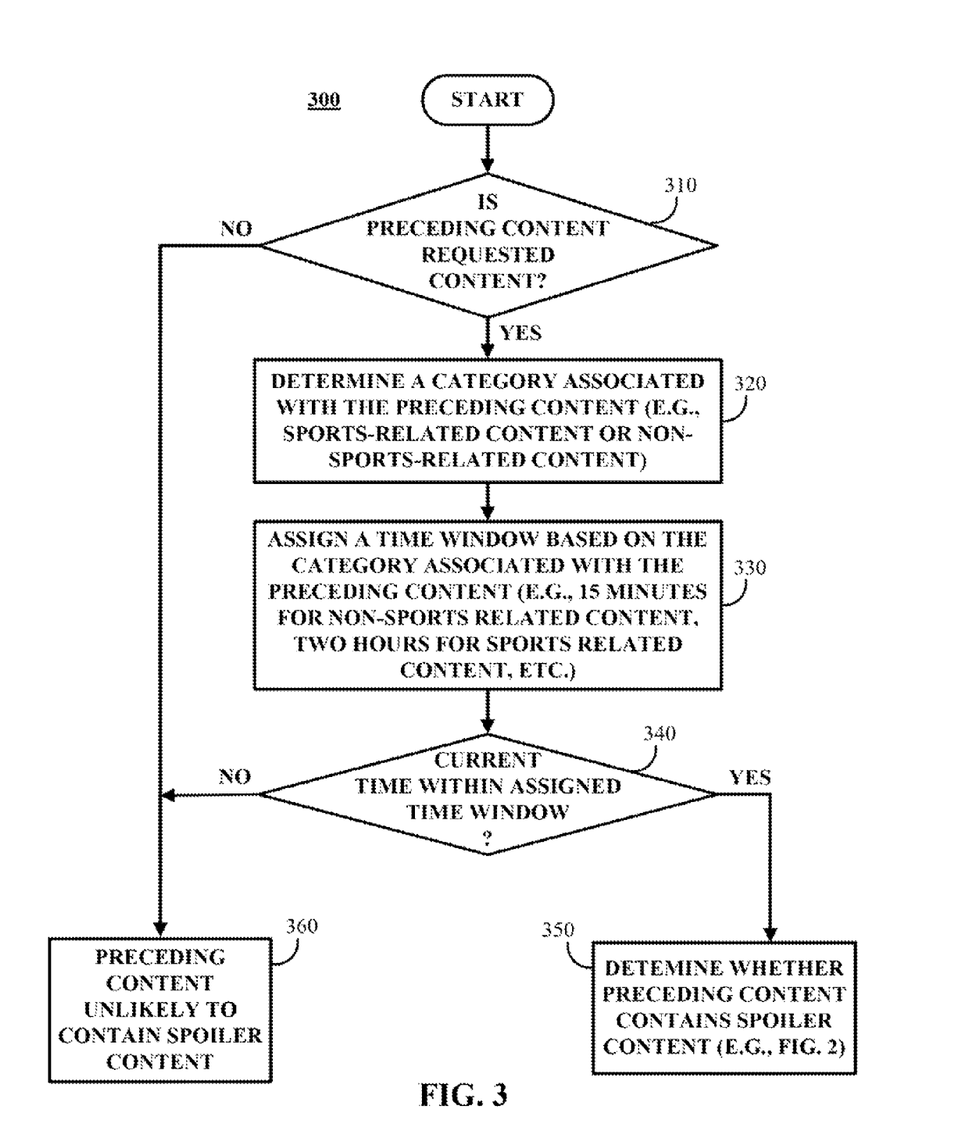
FIG. 3 is a flowchart of an illustrative process for determining whether preceding content on a channel is requested content that contains spoiler content in accordance with some embodiments of the disclosed subject matter.

Turning to FIG. 3, FIG. 3 is a flow chart of an illustrative process 300 for determining whether preceding content is requested content that contains spoiler content in accordance with some embodiments. As described above in connection with FIG. 1, when the content management application determines that the content currently scheduled to be provided on the channel is not requested content or does not contain spoiler content, the content management can review preceding content that was scheduled on the current channel within a predetermined amount of time to determining whether the preceding content is requested content that contains spoiler content. This can, for example, inhibit the presentation of an ending of a prior television program that runs over into the beginning of the program scheduled to be provided on the channel.

At 310, the content management application can determine whether preceding content is requested content. This can be similar to, for example, 120 of FIG. 1. For example, the content management application can analyze metadata associated with a storage device (e.g., a digital video recorder connected to the television display device) and determining whether the preceding content being provided on the channel has also been selected for recording on the storage device. The content management application can use the metadata associated with the storage device to determine whether one or more record requests for particular content have been made (e.g., a record request for an episode of a program in response to the user selecting a record option on a remote control or other suitable user input device, a series record request for multiple episodes of a program, an automatically generated record request based on user preferences, etc.) or determine recorded content on the storage device.

Upon comparing the metadata associated with the preceding content and the metadata associated with the storage device (e.g., metadata associated with record requests, metadata associated with recorded content, etc.), the content management application can determine whether the content provided by the channel is requested content. For example, the content management application can determine whether a program title associated with the preceding content matches or partially matches a program title associated with recorded content stored on the storage device.

In some embodiments, with regard to recorded content stored on the storage device, the content management application can also determine whether the recorded content has been viewed by the user. For example, the content management application can extract viewing data or other suitable metadata from the storage device that indicates whether recorded content has been viewed to completion by the user. In this example, the content management application can determine whether the preceding content matches recorded content that has not been viewed to completion by the user.

In response to determining that the preceding content is requested content, the content management application can proceed to 320. Alternatively, if the content management application does not designate the preceding content as requested content, the content management application can indicate that the preceding content is unlikely to contain spoiler content at 360. For example, this indication can be provided as a response to the determination of spoiler content at 130 of FIG. 1. In another example, this indication can be provided to the television display device as a confirmation to remain on the current channel.

At 320, the content management application can determine a category associated with the preceding content. For example, the content management application can retrieve metadata associated with the preceding content. In a more particular example, the content management application can transmit a query to a program guide data source for a content category or any other suitable category information associated with the preceding content provided on the channel.

Based on the category associated with the preceding content, the content management application can assign a time window that begins at the scheduled end time of the preceding content at 330. For example, the content management application can assign a time window of two hours from the end of the preceding content in response to determining that the preceding content belongs to a sporting event category or an awards show category. In another example, the content management application can assign a time window of fifteen minutes from the end of the preceding content in response to determining that the preceding content belongs to a comedy series category.

At 340, the content management application can determine the current time that the channel has been selected for providing content to the user and determine whether the current time is within the time window from the end of the preceding content. In response to determining that the current time is within the time window, the content management application can determine whether the preceding content contains spoiler content at 350. For example, the content management application can perform one or more of the verifications described in connection with FIG. 2. In a more particular example, the content management application can determine that the preceding content has been recorded on a digital video recorder, which causes the content management application to designate the preceding content as requested content, and, upon determining that the current time is within an assigned time window, the content management application can determine whether the preceding content falls into a particular content category (e.g., an excluded content category, such as news-related content). Upon determining that the preceding content does or is likely to contain spoiler content, the content management application can designate the channel as providing spoiler content for the remainder of the time window and select an alternate channel (e.g., 140 of FIG. 1).

Alternatively, prior to determining whether the current time is within the assigned time window, the content management application can determine whether the preceding content contains spoiler content. In response to determining the presence of such spoiler content, the content management application can designate the channel, as providing spoiler content until the time window has elapsed.

It should be noted that, although the embodiments described herein, generally relate to determining the presence of spoiler content provided by a default channel, this is merely illustrative. For example, the content management application can be used to inhibit the presentation of spoiler content in response to receiving a request from the user to tune to a different channel.

Figure 4:
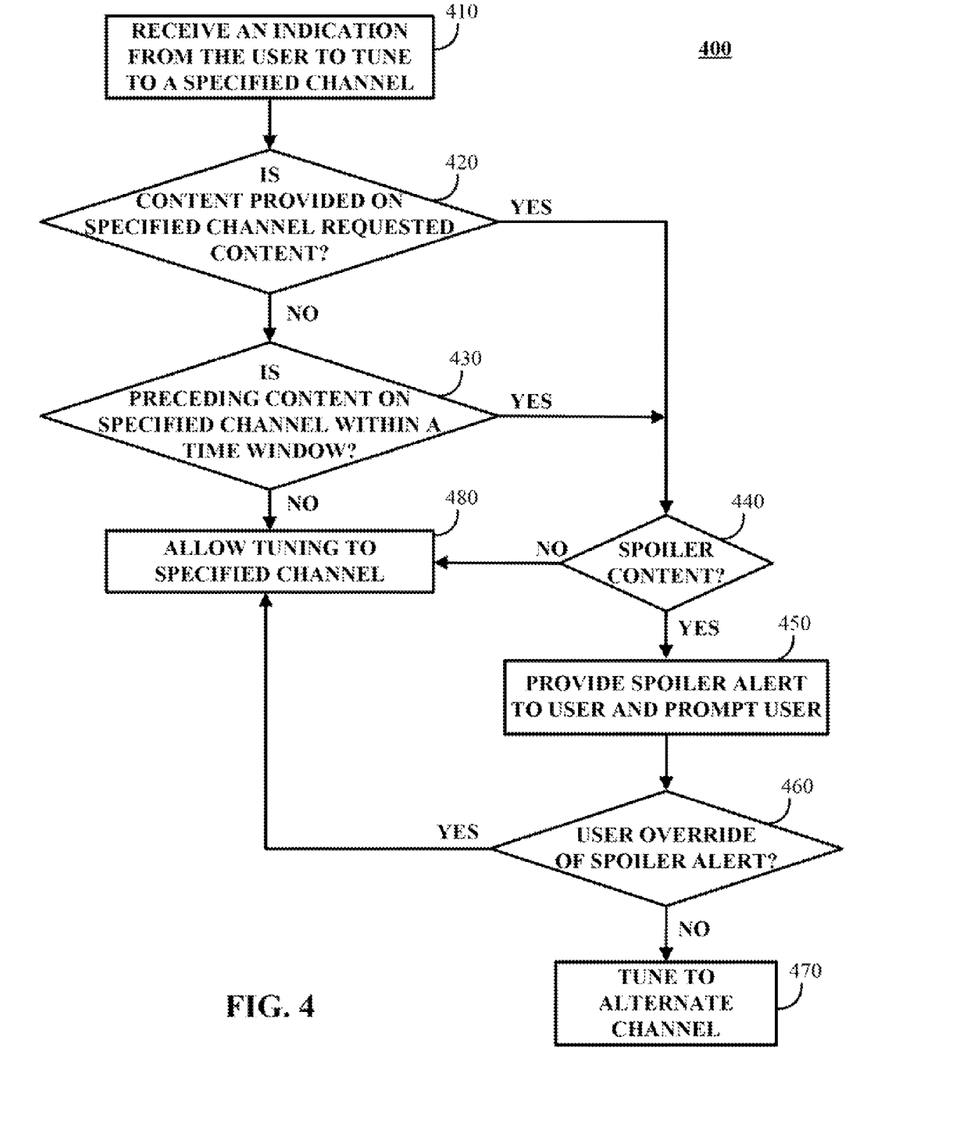
FIG. 4 is a flowchart of an illustrative process for inhibiting the presentation of spoiler content when a channel request is received in accordance with some embodiments of the disclosed subject matter.

FIG. 4 is a flow chart of an illustrative process 400 for determining whether spoiler content may be displayed in response to a user selecting a different channel in accordance with some embodiments. At 410, the content management application can receive an indication from the user to tune to a specified channel. For example, the content management application has determined that the user has inputted a channel number using a remote control or any other suitable user input device. In another example, the content management application has determined that the user has requested to tune to a specified channel from a program grid displayed on a second screen device (e.g., a mobile telephone, a tablet computing device, etc.).

At 420, the content management application can determine whether the content provided on the specified channel is requested content. This can be performed similar to 120 of FIG. 1, where the content management application determines whether metadata associated with the content provided on the specified channel matches metadata associated with the storage device. Alternatively, at 430, if the content management application has determined that the content currently provided on the specified channel is not requested content (e.g., the program title of the currently provided content on the specified channel does not match a program title associated with recorded content or record requests stored on a digital video recorder), the content management application can determine whether preceding content provided on the specified channel is requested content that occurs within a particular time window (e.g., the current time is less than 30 minutes from the ending time of the preceding content). This can be performed similar to 320, 330, and 340 of FIG. 3. For example, the content management application can determine whether the specified channel provides a television program within a designated amount of time preceding the currently airing program is requested content that has not been viewed on the storage device.

In response to determining that the current content on the specified channel is requested content at 420 or that preceding content on the specified channel is requested content within a time window at 430, the content management application can determine whether the currently airing content or the preceding content contain spoiler content at 440. For example, process 400 can return to the one or more verifications described in connection with FIG. 2. Alternatively, the content management application can, prior to receiving the indication from the user to tune to a specified channel, compile a list of requested content and metadata associated with such requested content. In this example, the content management application can determine whether the current content or preceding content contain spoiler content by comparing its metadata with metadata included in the list of requested content.

In response to determining that spoiler content may be provided to the user by the current content or preceding content on the specified channel, the content management application can present the user with a spoiler alert that informs the user of the presence of spoiler content. For example, the content management application can cause an alert window to be displayed that prompts the user to indicate whether to continue to the specified channel. In another example, the alert window can include that the user press a designated button on a remote control or any other suitable user input device to override the content management application from tuning away from the specified channel.

In response to determining that the user has indicated to tune away from the specified channel as it may provide content containing spoiler content at 460, the content management application, can select an alternate channel. Upon determining that the alternate channel does not provide content that is requested content or contains spoiler content, the content management application can instruct a tuner or any other suitable circuitry associated with the television display device to tune to the alternate channel at 470.

Alternatively, in response to receiving an indication from the user to tune to the specified channel, the content management application can transmit an instruction to a tuner or any other suitable circuitry associated with the television display device to tune to the specified channel at 480. For example, the content management application can receive an override instruction from the user using a user input device in response to presenting the alert window and can tune to the specified channel.

It should be understood that the above described steps of the flow diagrams of FIGS. 1-4 can be executed or performed in any order or sequence not limited to the order and sequence shown and described in the figures. Also, some of the above steps of the flow diagrams of FIGS. 1-4 can be executed or performed substantially simultaneously where appropriate or in parallel to reduce latency and processing times.

Figure 5:
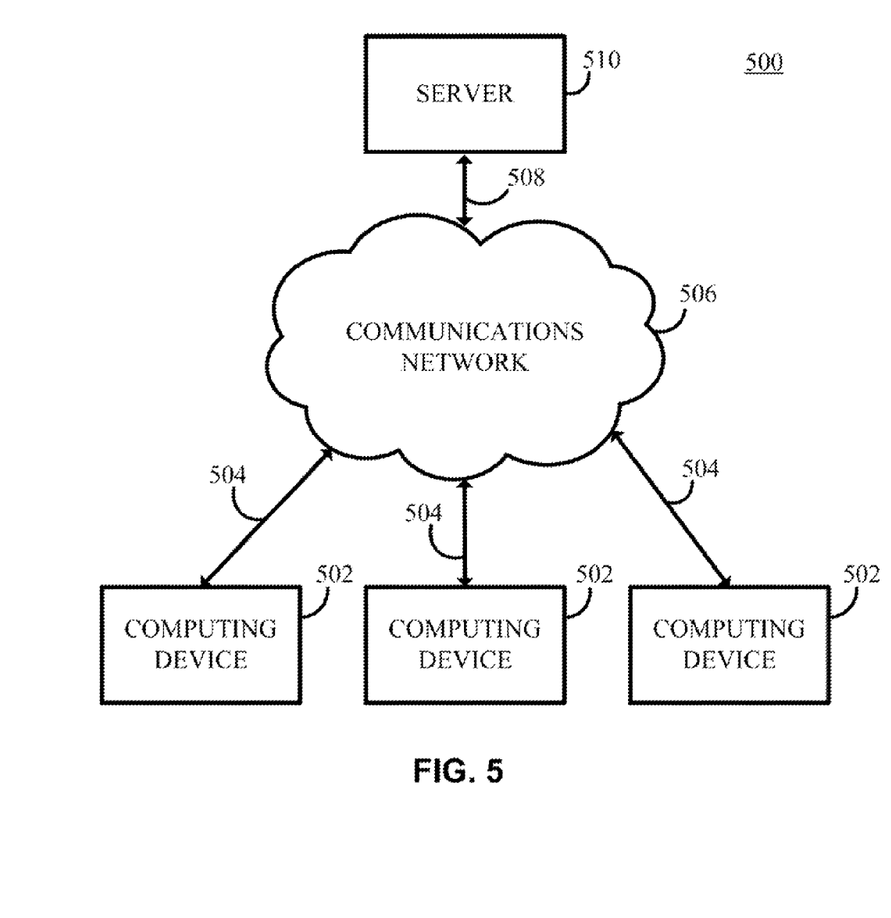
FIG. 5 shows a schematic diagram of an illustrative system suitable for implementation of a content management application for inhibiting the presentation of spoiler content when selecting a channel based on requested content in accordance with some embodiments of the disclosed subject matter.

FIG. 5 is a generalized schematic diagram of a system on which the content management application can be implemented in accordance with some embodiments of the disclosed subject matter. As illustrated, system 500 can include one or more computing devices 502, such as a user computing device for viewing content and/or obtaining, recording and playing back media content items from various sources (e.g., a digital video recorder connected to the user computing device), a tablet computing device for transmitting user instructions to a television device and/or playing back recorded content from a storage device, etc. For example, computing device 502 can be implemented as a personal computer, a tablet computing device, a personal digital assistant (PDA), a portable email device, a multimedia terminal, a mobile telephone, a gaming device, a set-top box, a television, a smart television, etc.

In some embodiments, computing device 502 can include a storage device, such as a hard drive, a digital video recorder, a solid state storage device, a gaming console, a removable storage device, or any other suitable device for storing media content, media guidance information, etc. In this embodiment, the content management application can be implemented on a digital video recorder or any other suitable storage device, where the digital video recorder is connected to a television display device used to display television programming. The digital video recorder running the content management application can obtain metadata associated with content provided on a channel from a media guidance data source for comparison with metadata associated with record requests and recorded content stored in the digital video recorder. The digital video recorder running the content management application can also transmit tuning instructions to the television display device over any suitable connection.

In some embodiments, computing device 502, on which the content management application can be implemented, may function as a standalone device, where computing device 502 monitors the content being displayed by the television display device and monitors the storage device. Such a computing device can transmit channel change commands (e.g., tune to an alternate channel, tune to a specified channel, etc.) to one or more tuners associated with the television display device using a wireless connection, such as Bluetooth, infrared (IR), or any other suitable short-range communication path.

In some embodiments, computing device 502 can include a second screen device. For example, the second screen device can communicate with a storage device connected to a television display device. In response to determining that content provided by a channel on the second screen device is requested content that contains spoiler content, computing device 502 can transmit instructions to the second screen device to tune to an alternate channel that does not provide requested content that contains spoiler content. In another example, a second screen device can present the user with spoiler content preferences, where the spoiler content preferences are transmitted to a set-top box or a television device. In yet another example, the second screen device can play back a program recorded by a computing device 502 configured as a digital video recorder.

In some embodiments, computing devices 502 can include one or more master computing devices (such as a set-top box configured as a digital video recorder) and one or more slave computing devices (e.g., a set-top box without storage for recording content). For example, a digital video recorder can act as a master computing device and one or more set-top boxes can act as slave computing devices. In such a configuration, the digital video recorder can communicate with the slave set-top boxes and can transmit recorded content to one or more of the slave set-top boxes for playback on a television display device associated with the slave set-top box in response to a user instruction to play the recorded content using the slave set-top box. It should be noted that any suitable number of master computing devices and slave computing devices can be present, where a master computing device can also act as a slave computing device at some points in time and vice versa.

Computing devices 502 can be local to each other or remote from each other. For example, when one computing device 502 is a television and another computing device 502 is a second screen device (e.g., a tablet computing device, a mobile telephone, etc.), the computing devices 502 can be located in the same room. Computing devices 502 are connected by one or more communications links 504 to a communications network 506 that is linked via a communications link 508 to a server 510.

System 500 can include one or more servers 510. Server 510 can be any suitable server for providing access to the content management application, such as a processor, a computer, a data processing device, or a combination of such devices. For example, the content management application can be distributed into multiple backend components and multiple frontend components or interfaces. In a more particular example, backend components, such as media guidance data distribution, can be performed on one or more servers 510. Similarly, the graphical user interfaces displayed by the content management application, such as a spoiler alert interface for informing the user that content provided on a channel contains spoiler content, can be distributed by one or more servers 510 to computing device 502. For example, server 510 can be operated by a content provider that stores media content items and/or media guidance data in one or more databases, where the content management application, using server 510, displays a guidance display or any other suitable graphical user interfaces to users for searching and/or accessing media content items.

In some embodiments, server 510 can include any suitable server for providing content, such as broadcast content and/or any other suitable media content. For example, server 510 can include a content server for providing content to one or more computing devices 502. In some embodiments, server 510 can include any suitable server for providing media guidance information, such as scheduled program times, content descriptions, channel information, network information, rating information, etc.

More particularly, for example, each of the computing devices 502 and server 510 can be any of a general purpose device such as a computer or a special purpose device such as a client, a server, etc. Any of these general or special purpose devices can include any suitable components such as a processor (which can be a microprocessor, digital signal processor, a controller, etc.), memory, communication interfaces, display controllers, input devices, etc. For example, computing device 502 can be implemented as a personal computer, a tablet computing device, a personal digital assistant (PDA), a portable email device, a multimedia terminal, a mobile telephone, a gaming device, a set-top box, a television, a smartphone, etc.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Referring back to FIG. 5, communications network 506 can be any suitable computer network including the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), or any combination of any of such networks. Communications links 504 and 508 can be any communications links suitable for communicating data between computing devices 502 and server 510, such as network links, dial-up links, wireless links, hard-wired links, any other suitable communications links, or a combination of such links. Computing devices 502 enable a user to access features of the application. Computing devices 502 and server 510 can be located at any suitable location. In one embodiment, computing devices 502 and server 510 can be located within an organization. Alternatively, computing devices 502 and server 510 can be distributed between multiple organizations.

Figure 6:
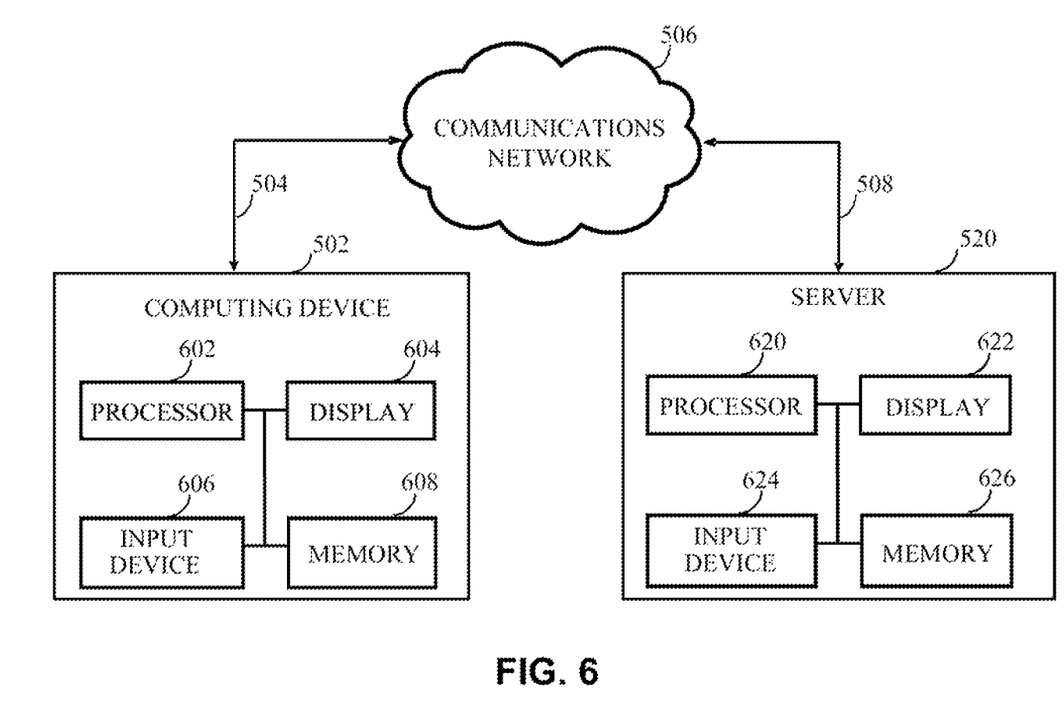
FIG. 6 shows a detailed example of the computing device of FIG. 5 that can be used in accordance with some embodiments of the disclosed subject matter.

Referring back to FIG. 5, the server 510 and one of the computing devices 502 depicted in FIG. 5 are illustrated in more detail in FIG. 6. Referring to FIG. 6, computing device 502 can include processor 602, display 604, input device 606, and memory 608, which can be interconnected. In a preferred embodiment, memory 608 contains a storage device for storing a computer program for controlling processor 602.

Processor 602 uses the computer program to present on display 604 the content management application and the data received through communications link 604 and commands and values transmitted by a user of computing device 602. It should also be noted that data received through communications link 604 or any other communications links can be received from any suitable source. Input device 1206 may be a computer keyboard, a mouse, a trackball, a keypad, a touchpad, a cursor-controller, a dial, a switchbank, a lever, a remote control, or any other suitable input device as would be used by a designer of input systems or process control systems. Alternatively, input device 606 can be a finger or stylus used on a touch screen display 604.

Server 610 can include processor 620, display 622, input device 624, and memory 626, which can be interconnected. In a preferred embodiment, memory 626 contains a storage device for storing data received through communications link 608 or through other links, and also receives commands and values transmitted by one or more users. The storage device further contains a server program for controlling processor 620.

In some embodiments, the application can include an application program interface (not shown), or alternatively, the application can be resident in the memory of computing device 602 or server 610. In another suitable embodiment, the only distribution to computing device 602 can be a graphical user interface ("GUI") which allows a user to interact with the application resident at, for example, server 610.

In one particular embodiment, the application, can include client-side software, hardware, or both. For example, the application can encompass one or more Web-pages or Web-page portions (e.g., via any suitable encoding, such as Hyper-Text Markup Language ("HTML"), Dynamic HyperText Markup Language ("DHTML"), Extensible Markup Language ("XML"), JavaServer Pages ("JSP"), Active Server Pages ("ASP"), Cold Fusion, or any other suitable approaches).

Although the application is described herein as being implemented on a user computer and/or server, this is only illustrative. The application can be implemented on any suitable platform (e.g., a personal computer ("PC"), a mainframe computer, a dumb terminal, a data display, a two-way pager, a wireless terminal, a portable telephone, a portable computer, a palmtop computer, an H/PC, an automobile PC, a laptop computer, a cellular phone, a personal digital assistant ("PDA"), a combined cellular phone and PDA, a smartphone, etc.) to provide such features.

Accordingly, systems, methods, and media for inhibiting the presentation of spoiler content based on requested content are provided.

Although the disclosed subject matter has been described and illustrated in the foregoing illustrative embodiments, it is understood that the present disclosure has been made only by way of example, and that numerous changes in the details of implementation of the disclosed subject matter can be made without departing from the spirit and scope of the disclosed subject matter. Features of the disclosed embodiments can be combined and rearranged in various ways.

What is claimed is:

1. A method for content management, the method comprising:
   determining, using a hardware processor, a channel that has been selected for presenting content to a user;
   determining, using the hardware processor, that there is a recorded program on a storage device;
   determining, using the hardware processor, that the recorded program on the storage device has not been viewed to completion;
   in response to determining that the recorded program on the storage device has not been viewed to completion, identifying, using the hardware processor, the content presented on the channel as requested content based on a comparison of first metadata associated with the content and second metadata associated with the recorded program;
   determining, using the hardware processor, that the requested content contains spoiler content based on the following criteria being met, including: (i) determining that the first metadata associated with the content includes episode data or airing data; and (ii) determining that the second metadata associated with the recorded program indicates an earlier occurrence than the first metadata associated with the requested program; and
   in response to determining that both criteria have been met, selecting, using the hardware processor, an alternate channel for presentation.

2. The method of claim 1, wherein the first metadata is a first subset of program data associated with a television program being presented on the channel and the second metadata is a second subset of program data associated with the recorded program stored on the storage device.

3. The method of claim 1, wherein the first metadata and the second metadata include at least one of: a program title, a program identifier, an episode number, an episode title, a season number, a season title, a series number, a series identifier, an original airing date, an original airing channel, and a category.

4. The method of claim 1, wherein identifying the content presented on the channel as requested content further comprises determining one or more record requests stored on the storage device.

5. The method of claim 1, wherein identifying the content presented on the channel as requested content further comprises determining that the content scheduled for presentation on the channel is currently being recorded on the storage device.

6. The method of claim 1, further comprising:
determining whether a content category associated with the requested content belongs to an excluded content category; and
inhibiting the requested content from being designated as containing spoiler content in response to determining that the requested content belongs to the excluded content category.

7. The method of claim 1, further comprising determining whether the recorded content has not been viewed to completion by extracting viewing data from the second metadata associated with the recorded content stored on the storage device.

8. The method of claim 1, wherein selecting the alternate channel for presentation further comprises:
detecting that a first tuner has tuned to the channel; and
controlling a second tuner to tune to the alternate channel in response to the determination that the requested content contains spoiler content.

9. The method of claim 1, wherein the earlier occurrence is determined by comparing the episode data or the airing data associated with the recorded content to the episode data or the airing data associated with the requested program.

10. The method of claim 1, further comprising:
identifying preceding content provided on the channel as requested content;
determining a content category associated with the preceding content;
assigning a time window based on the content category associated with the preceding content;
determining a current time that the channel has been selected for presenting the content to the user; and
determining whether preceding content scheduled to be presented on the channel within the time window contains spoiler content.

11. A system for content management, the system comprising:
a media storage device that stores a plurality of recorded content upon request by a user; and
a processor that is configured to:
determine a channel that has been selected for presenting content to a user
determine that there is a recorded program on the media storage device;
determining that the recorded program on the media storage device has not been viewed to completion;
in response to determining that the recorded program on the storage device has not been viewed to completion, identify the content presented on the channel as requested content based on a comparison of first metadata associated with the content and second metadata associated with the recorded program;
determine that the requested content contains spoiler content based on the following criteria being met, including: (i) determining that the first metadata associated with the content includes episode data or airing data; and (ii) determining that the second metadata associated with the recorded program indicates an earlier occurrence than the first metadata associated with the requested program; and
in response to determining that both criteria have been met, select an alternate channel for presentation.

12. The system of claim 11, wherein the first metadata is a first subset of program data associated with a television program being presented on the channel and the second metadata is a second subset of program data associated with the recorded program stored on the media storage device.

13. The system of claim 11, wherein the first metadata and the second metadata include at least one of: a program title, a program identifier, an episode number, an episode title, a season number, a season title, a series number, a series identifier, an original airing date, an original airing channel, and a category.

14. The system of claim 11, wherein the processor is further configured to identify the content presented on the channel as requested content by determining one or more record requests stored on the media storage device.

15. The system of claim 11, wherein the processor is further configured to identify the content presented on the channel as requested content by determining that the content scheduled for presentation on the channel is currently being recorded on the media storage device.

16. The system of claim 11, wherein the processor is further configured to:
determine whether a content category associated with the requested content belongs to an excluded content category; and
inhibit the requested content from being designated as containing spoiler content in response to determining that the requested content belongs to the excluded content category.

17. The system of claim 11, wherein the processor is further configured to determine whether the recorded content has not been viewed to completion by extracting viewing data from the second metadata associated with the recorded content stored on the media storage device.

18. The system of claim 11, wherein the processor is further configured to select the alternate channel for presentation by:
detecting that a first tuner has tuned to the channel; and
controlling a second tuner to tune to the alternate channel in response to the determination that the requested content contains spoiler content.

19. The system of claim 11, wherein the processor is further configured to determine the earlier occurrence by comparing the episode data or the airing data associated with the recorded content to the episode data or the airing data associated with the requested program.

20. The system of claim 11, wherein the processor is further configured to:
identify preceding content provided on the channel as requested content;
determine a content category associated with the preceding content;
assign a time window based on the content category associated with the preceding content;
determine a current time that the channel has been selected for presenting the content to the user; and
determine whether preceding content scheduled to be presented on the channel within the time window contains spoiler content.

21. A non-transitory computer-readable medium containing computer-executable instructions that, when executed by a processor, cause the processor to perform a method for content management, the method comprising:
- determining a channel that has been selected for presenting content to a user;
- determining, using the hardware processor, that there is a recorded program on a storage device;
- determining, using the hardware processor, that the recorded program on the storage device has not been viewed to completion;
- in response to determining that the recorded program on the storage device has not been viewed to completion, identifying the content presented on the channel as requested content based on a comparison of first metadata associated with the content and second metadata associated with the recorded program;
- determining that the requested content contains spoiler content based on the following criteria being met, including: (i) determining that the first metadata associated with the content includes episode data or airing data; and (ii) determining that the second metadata associated with the recorded program indicates an earlier occurrence than the first metadata associated with the requested program; and
- in response to determining that both criteria have been met, selecting an alternate channel for presentation.

22. The non-transitory computer-readable medium of claim 21, wherein the first metadata is a first subset of program data associated with a television program being presented on the channel and the second metadata is a second subset of program data associated with the recorded program stored on the storage device.

23. The non-transitory computer-readable medium of claim 21, wherein the first metadata and the second metadata include at least one of: a program title, a program identifier, an episode number, an episode title, a season number, a season title, a series number, a series identifier, an original airing date, an original airing channel, and a category.

24. The non-transitory computer-readable medium of claim 21, wherein the method further comprises determining one or more record requests stored on the storage device.

25. The non-transitory computer-readable medium of claim 21, wherein the method further comprises determining that the content scheduled for presentation on the channel is currently being recorded on the storage device.

26. The non-transitory computer-readable medium of claim 21, wherein the method further comprises:
- determining whether a content category associated with the requested content belongs to an excluded content category; and
- inhibiting the requested content from being designated as containing spoiler content in response to determining that the requested content belongs to the excluded content category.

27. The non-transitory computer-readable medium of claim 21, wherein the method further comprises determining whether the recorded content has not been viewed to completion by extracting viewing data from the second metadata associated with the recorded content stored on the storage device.

28. The non-transitory computer-readable medium of claim 21, wherein the method further comprises:
- detecting that a first tuner has tuned to the channel; and
- controlling a second tuner to tune to the alternate channel in response to the determination that the requested content contains spoiler content.

29. The non-transitory computer-readable medium of claim 21, wherein the method further comprises determining the earlier occurrence by comparing the episode data or the airing data associated with the recorded content to the episode data or the airing data associated with the requested program.

30. The non-transitory computer-readable medium of claim 21, wherein the method further comprises:
- identifying preceding content provided on the channel as requested content;
- determining a content category associated with the preceding content;
- assigning a time window based on the content category associated with the preceding content;
- determining a current time that the channel has been selected for presenting the content to the user; and
- determining whether preceding content scheduled to be presented on the channel within the time window contains spoiler content.

* * * * *